July 20, 1926.
E. FAIMAN
PEDAL HOLDER
Filed March 12, 1926
1,593,489
2 Sheets-Sheet 1
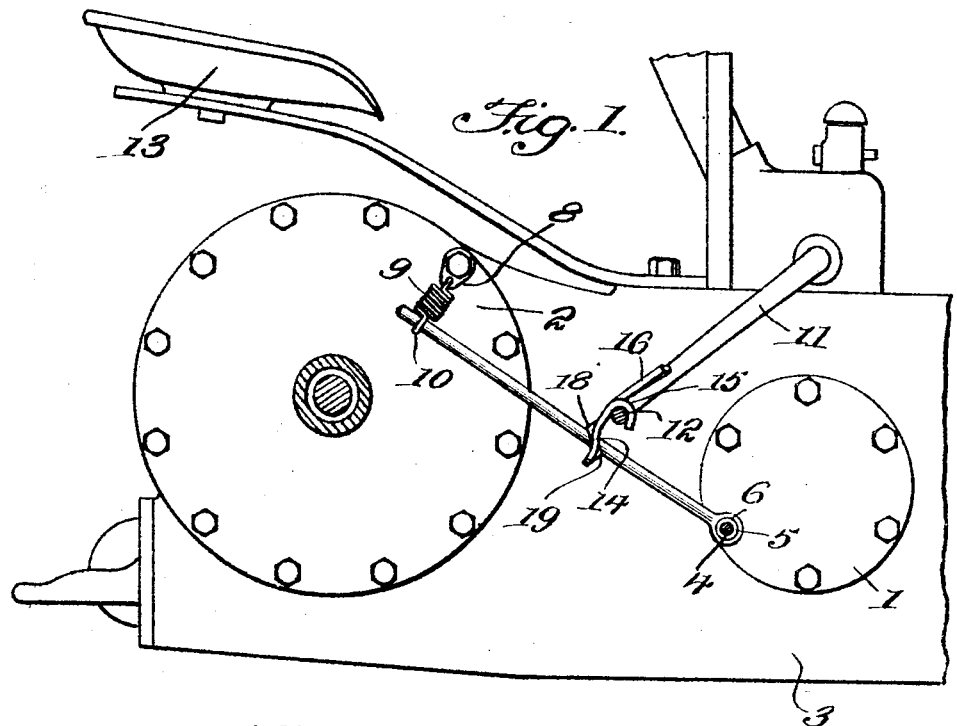
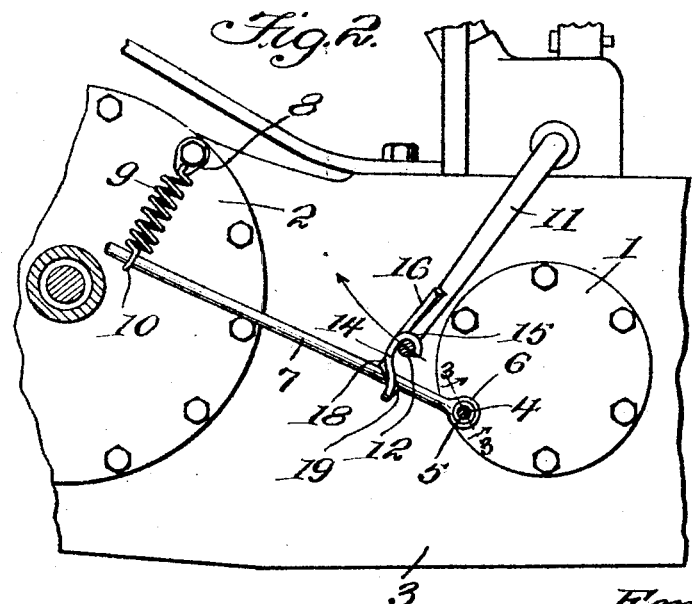
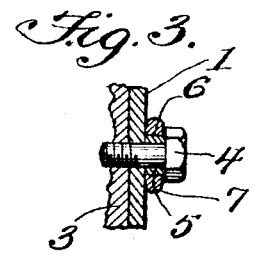
Emil Faiman
INVENTOR
by Victor J. Evans
ATTORNEY
WITNESS J. T. L. Wright

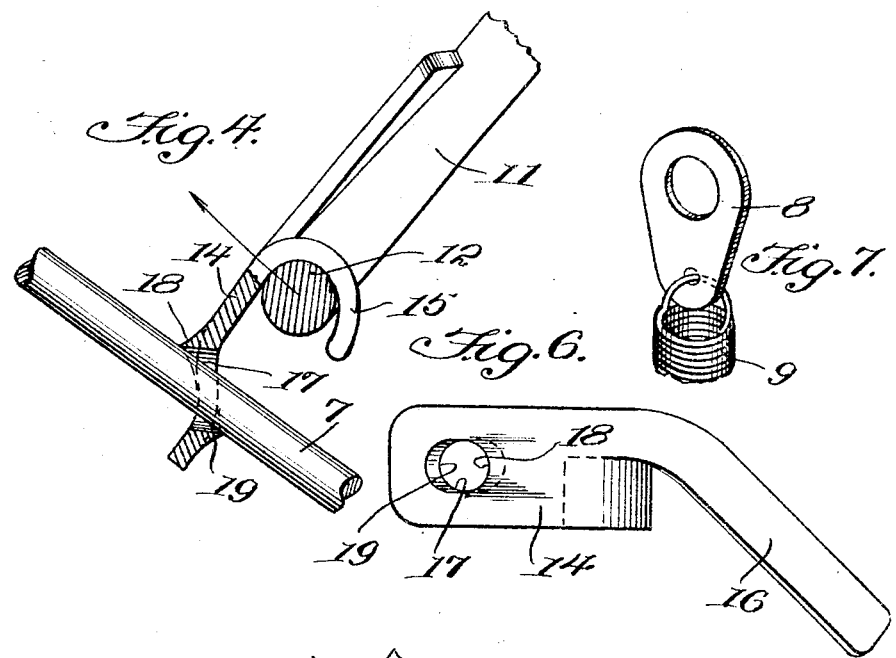
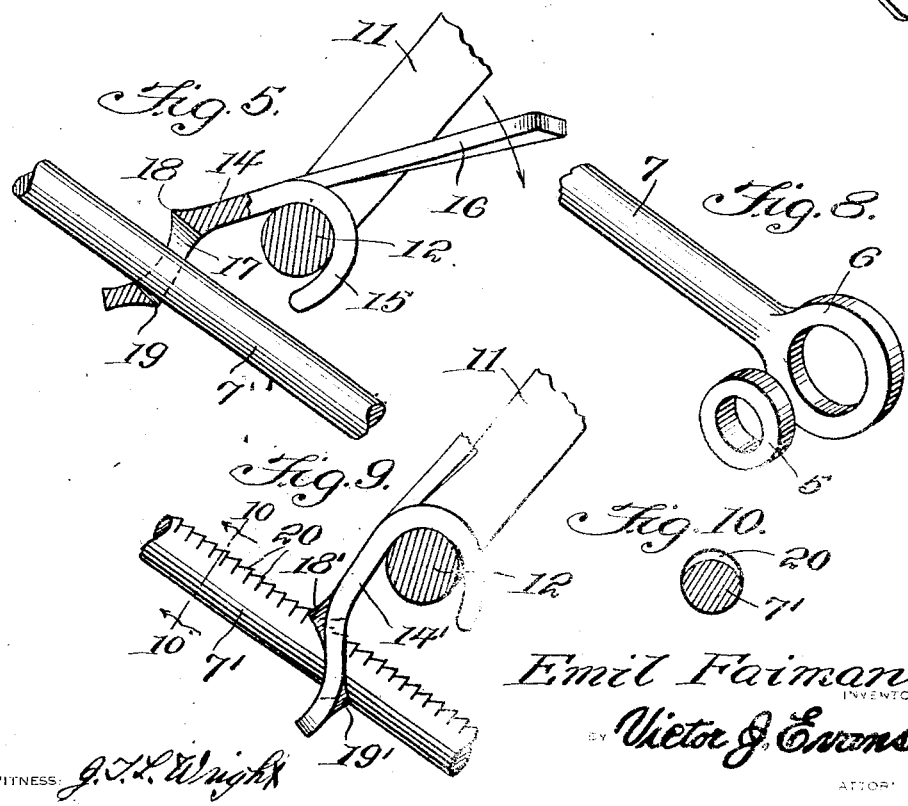

Patented July 20, 1926.

1,593,489

UNITED STATES PATENT OFFICE.

EMIL FAIMAN, OF LEIGH, NEBRASKA.

PEDAL HOLDER.

Application filed March 12, 1926. Serial No. 94,360.

The object is the provision of an extremely simple but thoroughly effective means which may be conveniently operated from the seat of the driver of a Fordson or like tractor, for sustaining the clutch pedal in declutching position and which is likewise readily operable to permit of the pedal returning to clutching position.

A further object is the provision of a means for this purpose which can be cheaply manufactured, easily installed without altering the parts of the tractor, and successfully employed even should the clutch pedal be bent from rough use or otherwise out of normal position.

To the attainment of the foregoing, the invention consists in the improvement as hereinafter described and definitely claimed.

In the drawings:

Figure 1 is a fragmentary side elevation of a tractor provided with the improvement.

Figure 2 is a similar view but showing the parts moved to sustain the clutch pedal in declutching position.

Figure 3 is a fragmentary sectional view on the line 3—3 of Figure 2.

Figure 4 is a detail elevation, with parts in section, to illustrate the gripping engagement of my improvement on the supporting bar thereof, when the clutch pedal is held in locked position.

Figure 5 is a similar view showing the arrangement of parts when the foot pedal of the improvement is moved to release position.

Figure 6 is a top plan view of the foot pedal of the improvement.

Figure 7 is a perspective view of the clip employed for supporting the spring that embodies an important element of the improvement.

Figure 8 is a fragmentary perspective view looking toward the eye end of the rod employed and also showing the bearing for the said eye end of the rod.

Figure 9 is a fragmentary side elevation illustrating a slight modification.

Figure 10 is a sectional view approximately on the line 10—10 of Figure 9.

In carrying out my improvement I remove one of the bolts on the foot rest 1 and one of the bolts from the axle housing 2 of a Fordson or like tractor 3. The bolt 4, removed from the foot rest 1, is replaced but is first passed through an annular bearing 5 that is received in an eye 6 on one end of a rod 7, the head of the bolt 4 contacting with the end eye 6. The rod 7 may be square or round in cross section.

The bolt removed from the axle housing is also replaced, after the said bolt has been passed through an opening in a comparatively short plate 8 that provides a hanger for a helical spring 9. The outer convolution of the spring is rounded upon itself, as at 10, to receive therethrough the outer or free end of the rod 7.

The clutch pedal for the tractor is indicated by the numeral 11 and is provided with the usual offset end 12 that is engaged by the foot of the operator who occupies the seat 13 of the tractor.

Arranged for slidable movement on the rod 7 there is a plate which I will term the foot pedal of the improvement. The foot pedal comprises a somewhat widened body portion 14 which is preferably slitted centrally from one to its ends and the portion thereof at one side of the slit is rounded upon itself to form a hook 15 which is arranged over the end 12 of the clutch lever 11. The portion at the opposite side of the slit is bent at an outward angle, as at 16, and this portion provides the pedal proper, or that portion of the pedal which is engaged by the foot of the operator. The body is bent at an angle outwardly of but in the direction of the hook 15, and this angle portion is formed with an opening 17 through which the rod 7 passes. The diagonally opposite walls provided by the openings 17 are projected outwardly to provide cross sectionally V-shaped gripping portions 18 and 19, respectively. These gripping portions or teeth are adapted for biting engagement with the opposite sides of the rod 7 when pressure is exerted on the arm 16 to swing the clutch pedal 11 to declutching position, as illustrated in Figures 2 and 4 of the drawings. The rod 7 will then be swung downwardly against the tension of the spring 9, the said spring urging the rod into tight frictional or biting engagement with the rod 7 so that the clutch pedal is positively held against accidental movement. A pressure of the foot of the operator upon the arm portion 16 of the pedal will swing the latter to the position illustrated in Figure 5 of the drawings, thus bringing the teeth 18 and 19 out of biting engagement with the rod 7 and permitting the spring to urge the rod upwardly and the spring influenced clutch member to its initial position.

In Figure 9 of the drawings the upper edge of the rod 7' is provided with teeth 20, and these teeth are designed to be engaged by the upper tooth 18' of the foot pedal 14', the lower tooth 19' engaging the under and non-toothed face of the rod 7'. In other respects the construction is similar to that previously described.

While I have illustrated a satisfactory embodiment of my improved device my features of invention are capable of extended application and I do not wish to be limited to the specific structure herein shown and described.

Having described the invention, I claim:—

1. The combination with a tractor and the clutch pedal therefor, of a spring influenced rod pivotally supported on the tractor below the clutch pedal, a foot pedal having a hook portion to engage the offset end of the clutch pedal and having an elongated opening through which the rod passes and the opposite walls provided by the said opening designed for gripping engagement with the rod for holding the clutch member in declutched position.

2. The combination with a tractor and the clutch operating pedal therefor, of a rod having one end pivotally supported on the side of the tractor below the clutch pedal, an anti-frictional bearing for the rod, a spring engaging the rod and fixed to the tractor for holding the said rod at an angle on the side of the tractor, a foot pedal having an elongated opening therethrough through which the rod passes, said pedal having a hooked portion for engagement with the offset end of the clutch pedal, and the opposite walls provided by the opening in the foot pedal being formed with teeth for frictional engagement with the rod for holding the clutch pedal in declutched position.

3. The combination with a tractor and the clutch operating pedal therefor, of a rod pivotally supported on one side of the tractor below the clutch member, an anti-frictional bearing for the rod, a helical spring fixed on the side of the tractor having an eye end to receive the rod therethrough for sustaining the rod at an angle on said side of the tractor, a foot pedal comprising a plate having a hook portion to engage the offset end of the clutch pedal and having an angle finger above the hook, the body of the pedal being offset and provided with an opening through which the rod passes, and the diagonally opposite upper and lower walls provided by the opening being extended outwardly and pointed to form teeth, as and for the purpose set forth.

In testimony whereof I affix my signature.

EMIL FAIMAN.